United States Patent [19]

Stump et al.

[11] Patent Number: 4,527,359
[45] Date of Patent: Jul. 9, 1985

[54] SEGMENTED PLATEN WITH DIAPHRAGM CYLINDER CONTROL

[75] Inventors: Lee E. Stump, Brooklyn Park; Eugene C. David, Minneapolis; Dale Boehne, Cologne, all of Minn.

[73] Assignee: Timesavers, Inc., Minneapolis, Minn.

[21] Appl. No.: 602,920

[22] Filed: Apr. 23, 1984

[51] Int. Cl.³ .............................................. B24B 21/08
[52] U.S. Cl. ........................................ 51/138; 51/141
[58] Field of Search .................... 51/135 R, 137, 138, 51/139, 141, 146

[56] References Cited

U.S. PATENT DOCUMENTS

| | | | |
|---|---|---|---|
| 2,232,914 | 2/1941 | Hewitt | 291/15 |
| 3,374,583 | 3/1968 | Jacobi | 51/141 |
| 3,694,966 | 10/1972 | Heesemann | 51/138 |
| 3,859,757 | 1/1975 | Hessemann | 51/138 |
| 3,900,973 | 8/1975 | van der Linden | 51/135 BT |
| 3,911,627 | 10/1975 | Heesemann | 51/137 |
| 4,277,868 | 7/1981 | Huber et al. | 29/33 Q |

FOREIGN PATENT DOCUMENTS 2845366 5/1979 Fed. Rep. of Germany ........ 51/141
553623 9/1974 Switzerland ........................ 51/141

Primary Examiner—Robert P. Olszewski
Attorney, Agent, or Firm—Orrin Haugen; Thomas J. Nikolai; Douglas L. Tschida

[57] ABSTRACT

A sanding and polishing machine for individual workpieces having an infeed conveyor for carrying workpieces along a predetermined path through one or more tandemly arranged working stations for exposure to a series of endless abrasive belts. The abrasive belt contacts the workpiece under the influence of a multi-segmented platen, with each platen segment being arranged for adjustable positioning relative to the plane of the surface of the workpiece. Positioning of each individual platen segment is accomplished by virtue of the combination of a workpiece sensor together with an adjustable selected input supplementing the workpiece sensor so that one or more platen segments disposed adjacent to those segments actuated by the workpiece sensing units are also actuated, thus increasing the number of segments responding to the presence of workpieces in the working station and either symmetrically or asymmetrically enhancing the sensed width of the workpiece.

4 Claims, 12 Drawing Figures

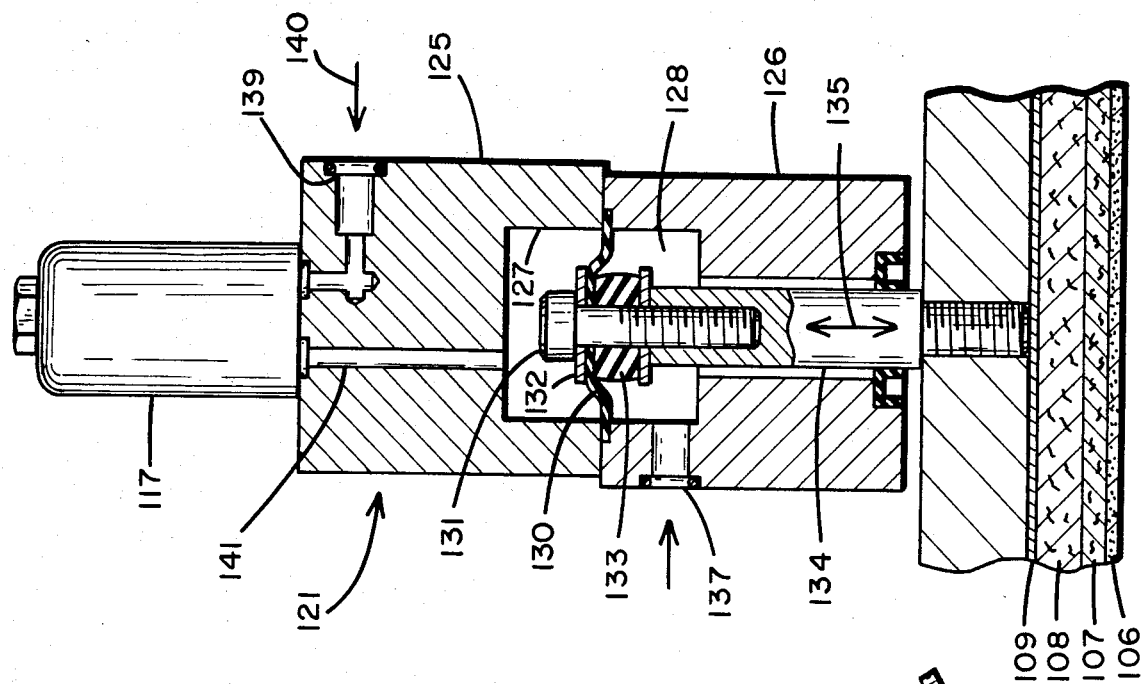
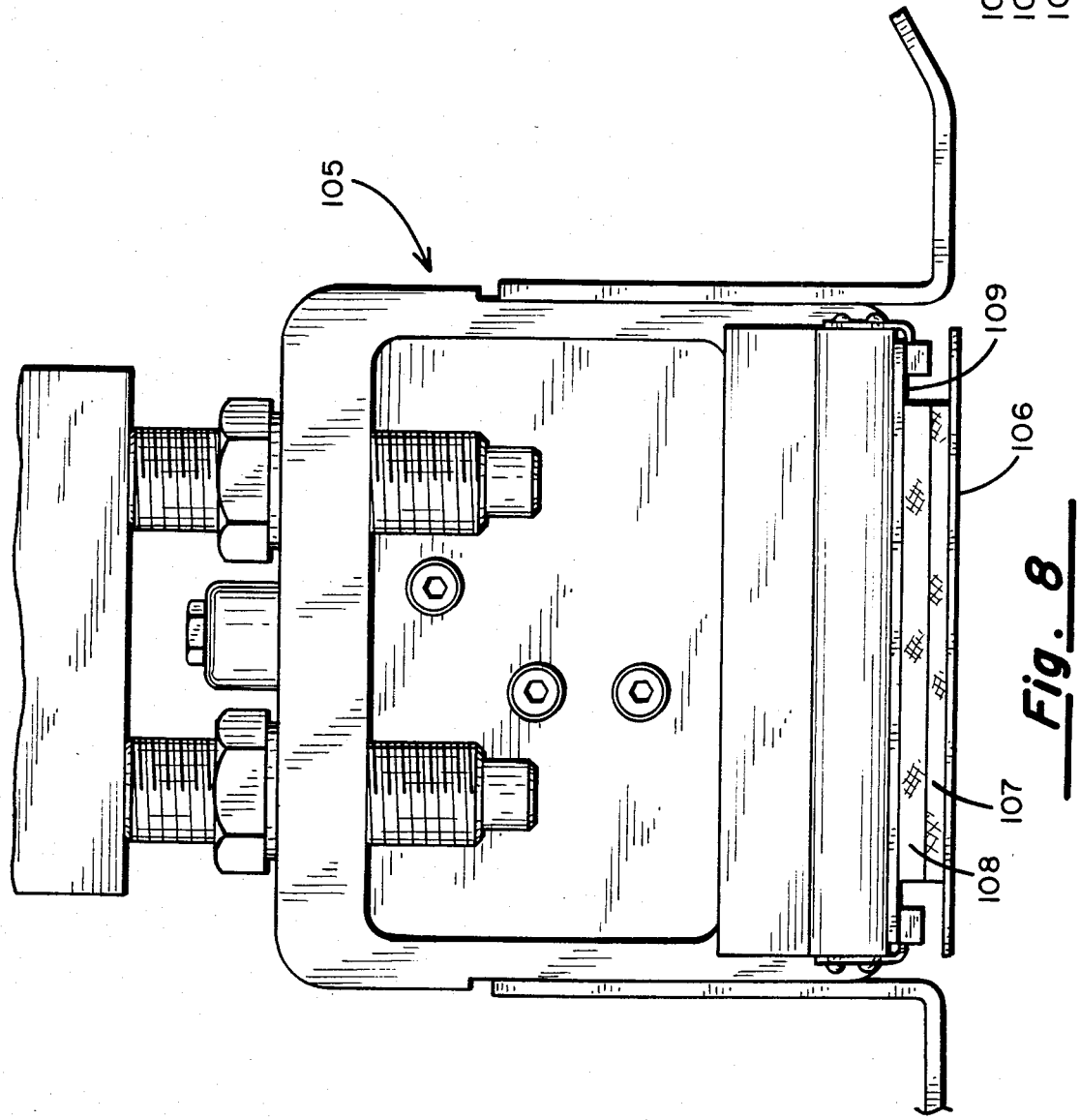

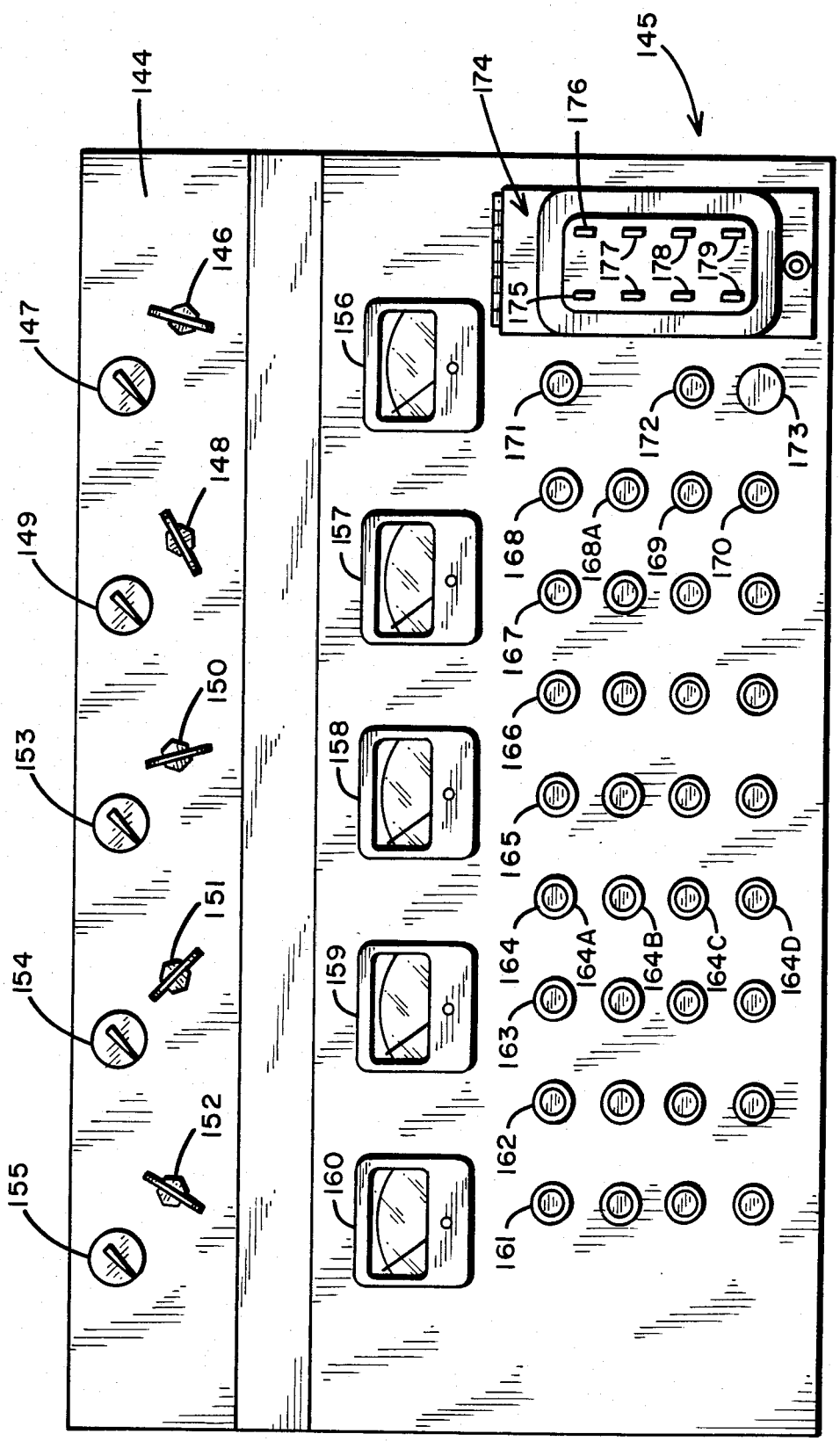
Fig. 10 CONTROL PANEL

SEGMENTED PLATEN WITH DIAPHRAGM CYLINDER CONTROL

BACKGROUND OF THE INVENTION

The present invention relates generally to abrasive belt sanding and polishing machines, and more particularly to means for controlling the positioning of an endless abrasive belt relative to the surface of a workpiece as the workpiece is transported by an infeed conveyor and into contact with an endless abrasive belt. More specifically, the present invention relates to means for controlling the configuration of the individual segments of a multi-segment platen so as to define or delineate the position, path and plane of the endless abrasive belt as it moves within the working station and forced into contact with the surface of the individual workpieces.

Certain varieties of wood, such as walnut, oak, birch and the like are desirable for use in the furniture industry, particularly because of their surface properties and pleasing appearance. However, because of their cost and decreasing availability, particularly as compared to the availability of more common woods or materials of construction such as fir, pine and particle-board, thin films or sheets of walnut or oak veneer are utilized, with the sheets of veneer being bonded or otherwise secured to the less expensive substrate or core. Either solid wood cores or cores made of particle-board material are widely employed and laminated panels with veneer surfaces are, of course, in widespread use in the furniture industry as well as in the construction industry.

In the furniture industry in particular, it has become commonplace to utilize veneer patterns of relatively non-abundant woods on a core or substrate of a relatively abundant wood. Sheets of veneer typically have a thickness of about 1/28th of an inch, and because of the techniques used in their preparation, veneers normally have an unfinished and/or rough surface texture. In the preparation of patterns of woods utilizing veneer surfaces, the individual pieces of veneer are selected and initially adhesively bonded to the surface of a core panel under pressure. In order to improve handling operations and to protect the exposed or outer surface of the veneer during the bonding operation, a paper surface layer or film is utilized. After completion of the bonding operation, the protective layer remains in place, and individual veneered panels are subjected to a sanding operation in order to remove the paper layer, remove surface irregularities and to prepare the veneer surface for later finishing operations. For the paper-removal operation, a cross-belt moving in a direction transverse to the direction of motion of the work is preferably utilized, while for finishing operations, a wide-belt moving along an axis parallel to the movement or motion of the work is normally utilized. Cross-belts have been found preferable for paper layer removal. In order to achieve and enhance operational efficiencies for these operations, a sanding and polishing machine may be provided with cross-belts and wide-belts arranged in tandem. As in the apparatus of the present invention, a sanding and polishing machine is provided with tandemly arranged cross-belts and longitudinally moving wide-belts.

In the treatment of individual workpieces, particularly veneered workpieces, the endless abrasive belt is typically backed with a resiliently biased pressure-pad. The resiliently biased pressure-pad is preferably in the form of a segmented platen, with the individual segments being provided with a pressure-bias so as to form a composite platen with a controlled profile of bias or advanced segments. For controlling the pad pressure across the surface of a workpiece, it has been found desirable to employ a platen comprised of a series of individually actuatable segments or portions. Such segmented platen means are known in the woodworking industry. Typically, preselected segments of the platen will be advanced outwardly, so that those preselected segments will be held or urged against the surface of the workpiece being treated. For many woodworking operations, it is desirable for the width of that portion of the platen which is to be held or urged against the workpiece be accurately controlled. In order to increase the degree or extent of control, the incremental size or width of each of the segments may be reduced. It has been found, however, that by merely reducing the size of the individual segments, the edge surfaces of certain types of individual workpieces being treated, including veneered workpieces, may be adversely affected due to dubbing, or other undesirable or anomalous edge treatment. The present invention reduces the problems of adverse edge treatment while preserving the desirable feature of reduced segment size. In particular, the utilization of individually actuated diaphragm cylinders has made it possible to contgrollably reduce the size of the individual platen segments, while maintaining accurate and positive control of the operation of each individual platen segment.

Typically, the advancing of individual platen segments, and the pressure exerted by each individually advanced platen segment against the surface of the workpiece is controlled by a workpiece sensor. The sensor is normally positioned along the infeed conveyor at a point up-stream from the working station in which the platen is disposed. This working station may employ either a cross-belt operating transversely to the axis of motion of the conveyor, or a wide-belt operating generally parallel to the axis of motion of the conveyor. In order to enhance the treatment of the surface of the workpiece, particularly as the workpiece is passing through a cross-belt working station, it is desirable that the operator be given the ability to widen the actual or operative width of that part of the platen which is advanced against the workpiece by increasing the number of individual platen segments advanced to include those which lie transversely outwardly of the actual workpiece. This increase, in effect, artificially simulates a workpiece of greater width passing through the working station. Because of the difference in direction of motion of the cross-belt with respect to the direction of travel of the conveyor, it has been found desirable in certain instances to artifically simulate the workpiece in a non-symmetrical fashion, such as by adding a greater number of segments to be advanced on the downstream edge of the cross-belt/workpiece interface than on the leading belt/workpiece edge interface.

SUMMARY OF THE INVENTION

Therefore, in accordance with the present invention, the sanding and polishing machine of the present invention is provided with a segmented platen wherein each individual platen is individually advanced or operated from a system utilizing input signals derived from a plurality of sources, including a product sensor signal input, along with an adjustable selected input for advancing or otherwise actuating additional platen segments which lie transversely outwardly of those certain product sensors which generate a signal due to contact with a workpiece passing thereagainst. In this apparatus, the number of additional platen segments actuated on either side of the edge of the workpiece may be equal or unequal.

It is a primary object of the present invention to provide a sanding and polishing machine for individual workpieces utilizing a segmented platen, and with means provided for simulating a workpiece dimension which is in excess of the actual dimension of the workpiece passing through the working station of the sanding and polishing machine.

It is a further object of the present invention to provide an improved sanding and polishing machine utilizing endless abrasive belts, and wherein the position of the endless abrasive belt is controlled by a pressurized platen employing a plurality of individual segments, and wherein the individual platen segments are advanced in response to a signal generated by a workpiece or product sensor, and additionally may be advanced by an adjustable selected input signal for simulating a workpiece having a width dimension in excess of that actually sensed.

It is a further object of the present invention to provide an improved sanding and polishing machine which is equipped with one or more endless abrasive belts, and wherein the pressure-pad for each endless abrasive belt comprises a multi-segment platen, and wherein means for advancing individual platen segments include workpiece sensors for advancing those segments disposed immediately above the workpiece, along with means for advancing those segments beneath which a workpiece is passing, so as to simulate a workpiece width which is in excess of the width of the actual workpiece, and wherein the added or simulated added width of the workpiece may be either symmetrically or asymmetrically arranged relative to the edges of the actual workpiece.

It is yet a further object of the present invention to provide an improved sanding and polishing machine which utilizes a multi-segment platen means for controlling and delineating the path of the endless abrasive belt, and wherein the actual number of individual segments may be substantially increased without adversely affecting the quality of the work undertaken on the individual workpieces being treated and wherein the actual number of individual segments responding to the presence of a workpiece in the working station may be arbitrarily increased.

Other and further objects of the present invention will become apparent to those skilled in the art upon a study of the following specifications, appended claims and accompanying drawings.

DESCRIPTION OF THE DRAWINGS

FIG. 8 is an elevational view, partially in section and partially broken away of a portion of the apparatus, and taken along the line and in the direction of the arrows 8—8 of FIG. 7;

FIG. 9 is a detail vertical sectional view of a portion of the segmented platen of the present invention and as utilized for the cross-belt head, and being taken along the line and in the direction of the arrows 9—9 of FIG. 7;

FIG. 10 is an elevational view of the details of the control panel utilized for control of the individual segments of the improved platen of the present invention;

DESCRIPTION OF THE PREFERRED EMBODIMENT

Figure 1:
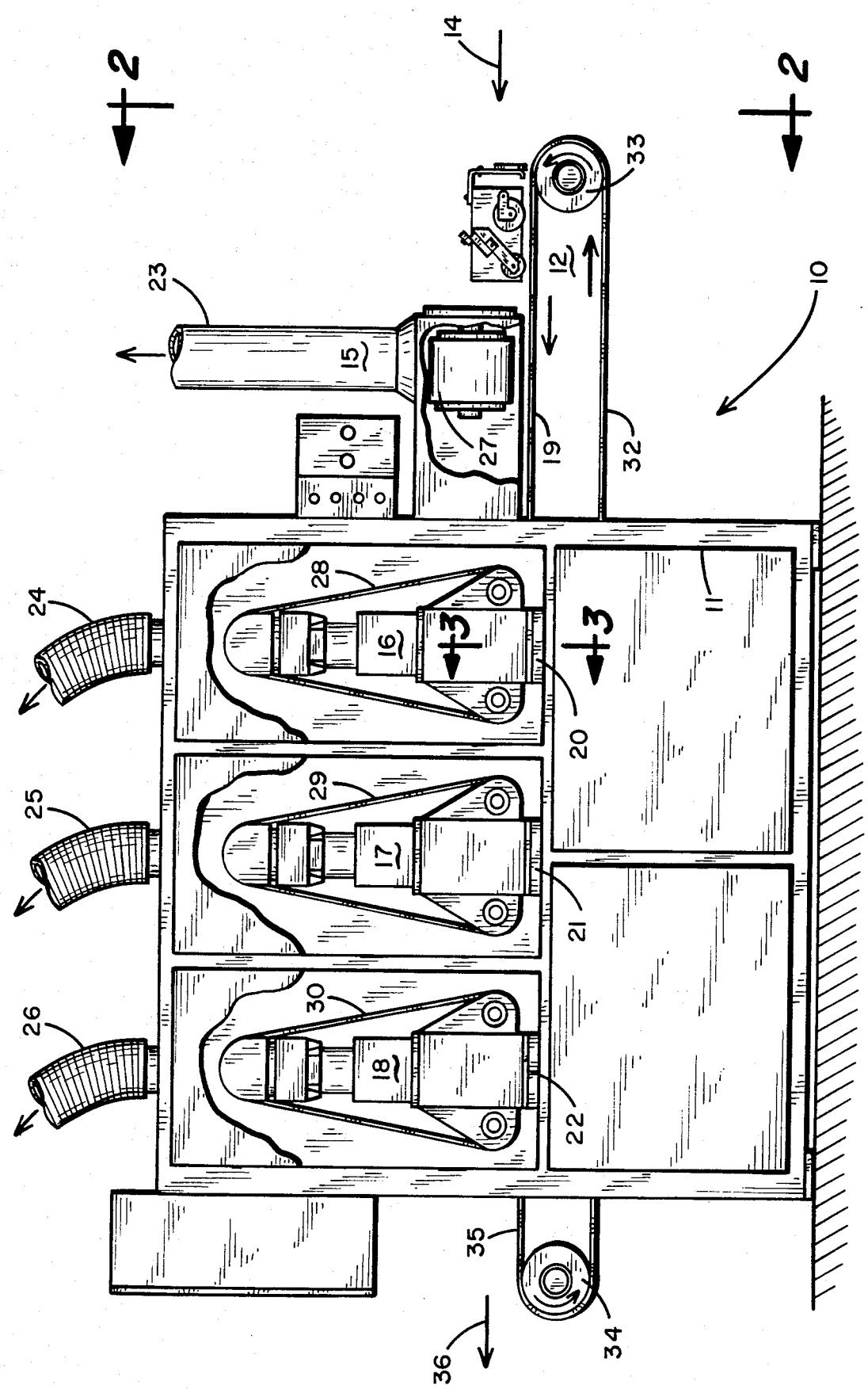
FIG. 1 is a side elevational view, with portions thereof broken away, and illustrating a typical sanding and polishing machine with cross-belts and wide-belts in tandem, and illustrating the infeed conveyor along with individual working stations disposed thereabove, and with the platen portions of the apparatus being equipped with the control features of the present invention.

In accordance with the preferred modification of the present invention, and with particular attention being directed to FIG. 1 of the drawings, the sanding and polishing machine generally designated 10 includes a frame means 11 including a plurality of rails and posts which together support an infeed conveyor means generally designated 12 arranged thereon for conveying workpieces along a predetermined axis or path such as is illustrated by infeed arrow 14. The sanding and polishing apparatus 10 further includes a plurality of driven endless abrasive belts, each being driven through mechanisms coupled to the frame, and with each belt defining one of a plurality of individual work stations. Specifically, the work station shown generally at 15 comprises a cross-belt working station, that is, a working station in which the axis of the direction of motion or travel of the belt is disposed generally transverse to the axis of the direction of motion of the infeed conveyor 12. Separate and individual abrasive belt driving assemblies are further shown generally at 16, 17 and 18. In this assembly, therefore, four individual and separate working stations are shown, such as the working stations 19, 20, 21 and 22, defined and in association with the endless abrasive belt driving means 15, 16, 17 and 18 respectively. Also, as is typical in sanding and polishing machines, exhaust stacks are provided for the individual belt driving assemblies, such as exhaust assemblies 23–26 inclusive.

It will be appreciated that the manner of driving the individual endless abrasive belts such as those belts at 27, 28, 29 and 30, associated with belt driving assemblies 15, 16, 17 and 18 respectively are, with the exception of the segmented platen of the present invention and controls therefor, standard and well-known in the art. Examples of such belt driving apparatus are endless abrasive belt driving apparatus illustrated in U.S. Pat. No. 3,888,050 and that certain application for United States Letters Patent, Ser. No. 569,971, filed Jan. 11, 1984, which is a Continuation of application Ser. No. 329,245, filed Dec. 10, 1981, entitled "ENDLESS ABRASIVE BELTS" and assigned to the same assignee as the present invention.

As is apparent in the view of FIG. 1, the conveyor 12 utilizes a transport belt 32 which spans the area defined between the conveyor rollers 33 and 34, and in addition to the infeed, define a discharge or outfeed area as at 35. The direction of motion of work passing into and through the apparatus, is illustrated by infeed directional arrow 14, and is further defined by outfeed directional arrow 36.

Figure 2:
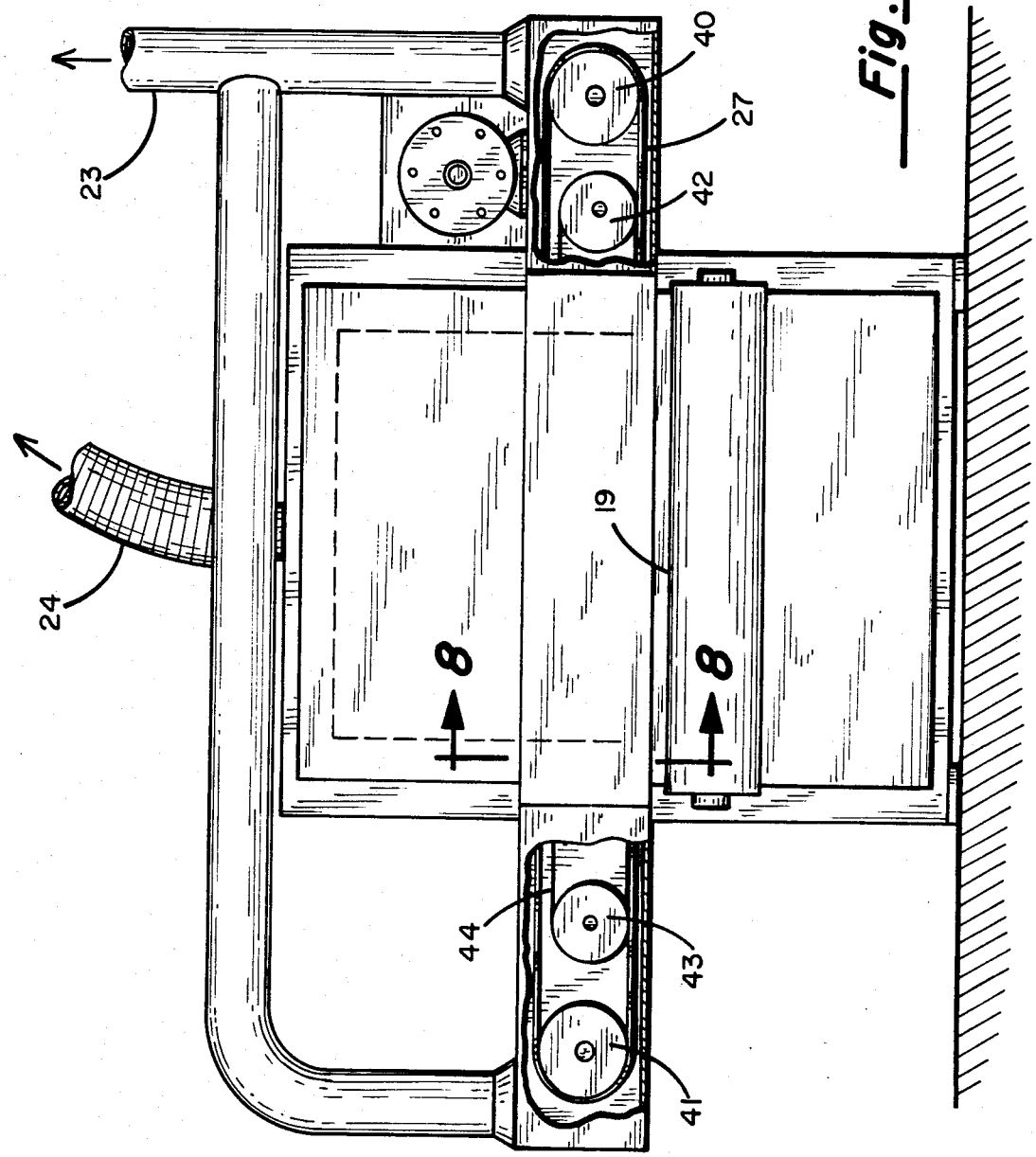
FIG. 2 is an infeed end elevational view of the apparatus illustrated in FIG. 1, and taken along the line and in the direction of the arrows 2—2 of FIG. 1, and with certain portions of the apparatus being broken away in order to more clearly illustrate the features of the invention.

Attention is now directed to FIG. 2 of the drawings, with this FIGURE being taken in the infeed direction of the apparatus. This view generally illustrates the configuration of the cross-belt system as it is disposed in the machine, and as it defines the configuration of the belt as it moves through working station 19. In particular, the endless abrasive cross-belt 27 is trained about drive drum 40, idler drum 41, and a pair of internal or auxiliary pressure belt guiding drums 42 and 43 respectively, carrying pressure belt 44.

Figure 3:
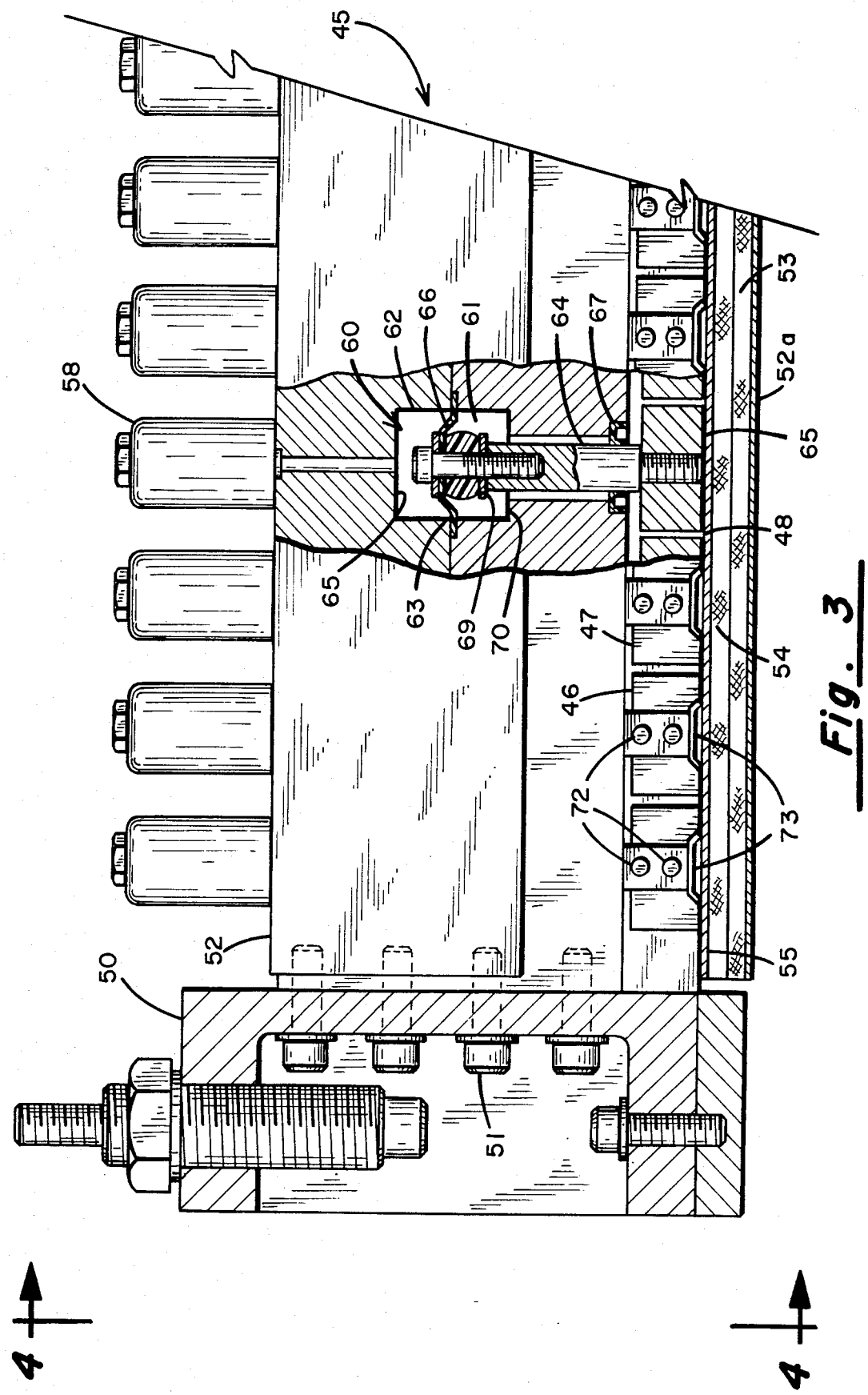
FIG. 3 is a vertical sectional view, on a slightly enlarged scale, and taken along the line and in the direction of the arrows 3—3 of FIG. 1.

With continuing attention being directed to FIGS. 1 and 2 of the drawings, additional attention is now directed to FIG. 3 of the drawings wherein a typical wide-belt segmented platen control assembly is shown. The platen control assembly, which is generally designated 45, includes a plurality of individually driven or individually advanced segments, such as the platen segments illustrated at 46, 47 and 48 for example. The platen assembly 45 is adjustably secured to the frame by means of the end support assembly 50, which, as illustrated, includes a plurality of mounting screws as at 51, for mounting the assembly 45 onto the frame 11. The platen assembly 45 further includes its sub-frame component 52 within which the individual platen segment control mechanisms or valves are mounted. The endless abrasive belt which is trained over the individual drums shown in the drive assembly 16 passes along an axis which, in FIG. 3, is perpendicular to the plane of the view of FIG. 3 at the base thereof, while passing over the graphite friction-reducing pad as at 52A. One or more backing pads may be provided, as shown at 53, to support graphite pad 52A. Polishing pad 54 is employed for enhancing structural integrity of the system, and as a further back-up for pads 52A and 53. Additionally, a spring-steel plate is provided as at 55 in order to ultimately delineate the directional and motion path for belt 28 as it moves in its endless orbit about its associated rotary drums. The details of the valves as well as the backing pads are illustrated in greater detail in FIG. 9 hereinafter. Specifically, limitations of draftsmanship render these details better illustrated in FIG. 9.

The disposition or configuration of the platen is ultimately controlled by means of individual valves, each of which is capable of advancing segments making up the entire width of the platen structure. Specifically, solenoids such as solenoid valve 58 are utilized to control the motion of individual cylinders within each platen assembly. Solenoid valves such as valve 58 are coupled to frame 52, with solenoid valve 58 being coupled to a source of compressed air, preferably to a closely adjacent manifold, with the output of solenoid valve 58 being, in turn, coupled to one chamber of the diaphragm cylinder controlling the motion of the diaphragm cylinder assembly generally designated 60. Assembly 60 comprises a pair of chambers 61 and 62, spaced apart by diaphragm 63. Diaphragm 63, in turn, provides response for rod 64, with rod 64 being, in turn, secured to and otherwise engaged with platen segmental pad 65. The length of the stroke for rod 64, is, in turn, controlled by a suitable bumper pad, such as that provided as at 65. A diaphragm seal cup is preferably provided, as at 66. Also, in order to reduce the consumption of compressed air, and enhance the operational efficiency and reduce operational noise, a seal is provided for the cylinder 60 as at 67. In order to further control the operation of cylinder assembly 60, when it is desired to de-couple cylinder 60 from the source of compressed air, this is normally accomplished by permitting solenoid valve 58 to vent chamber 62 to atmosphere.

As will become more apparent hereinafter, the individual portions of segmental pad 65 may be incrementally advanced by means of actuation of solenoid valve 58, which permits the introduction of air or other fluid under pressure to chamber 62, which overcomes the force due to pressure normally present in chamber 61, thereby causing a downward stroke or motion in rod 64, and the ultimate advancing, by a controlled incremental amount, of segmental pad 65. In order to control the length of the downward stroke of the rod of diaphragm cylinder assembly 60, a bumper surface may be provided as at 69, to engage or otherwise come into contact with abutment surface 70.

As will become more apparent hereinafter, the platen configuration, and thus the delineation of the path of motion for the endless belt, will be determined by the total number of individual segments such as segment 65, which are advanced at any given point in time. The advantages derived by virtue of the use of narrow segments, are neither overcome nor overwhelmed by the disadvantages which normally arise or are generated by the belt at the point at which the belt commences to move away from the plane of the surface of the work.

With continued attention to FIG. 3, rod 64, as that rod would be otherwise illustrated in adjacent assemblies, is secured in place at its free end by means of studs such as shown at 72—72. Additionally, a rod bar in generally channel-like configuration, is provided as at 73—73 for ultimate engagement with spring-steel plate 55.

Figure 4:
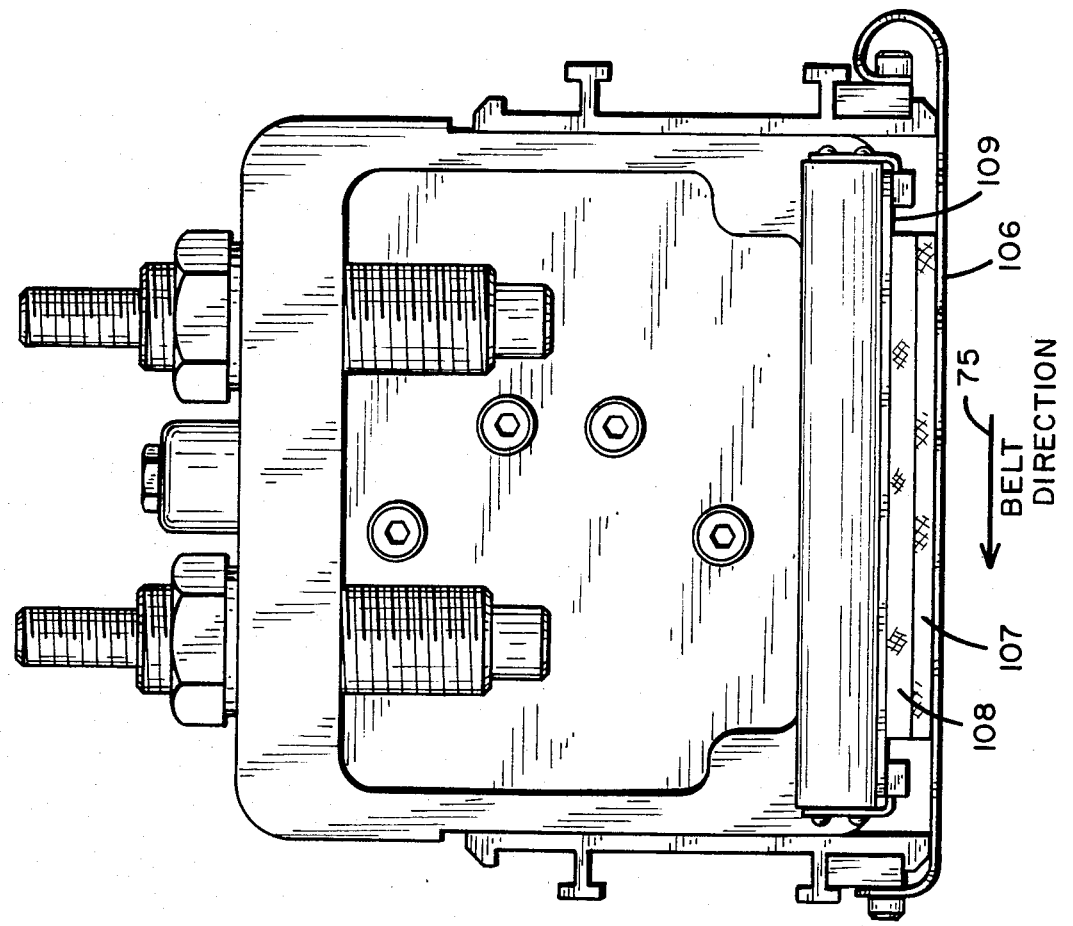
FIG. 4 is a side elevational view taken along the line and in the direction of the arrows 4—4 of FIG. 3, and illustrating certain details of the wide-belt sanding and polishing heads which control the motion of the endless abrasive belts and wherein the belts move along an axis of motion parallel to the axis of motion of the conveyor.

With attention now being directed to FIG. 4 of the drawings, it will be observed that the direction of motion of endless abrasive belt, such as belt 28, is along the line and in the direction of arrow 75. FIG. 4, in turn, illustrates in additional detail, certain of the features of that portion of the apparatus illustrated in FIG. 3.

Figure 5:
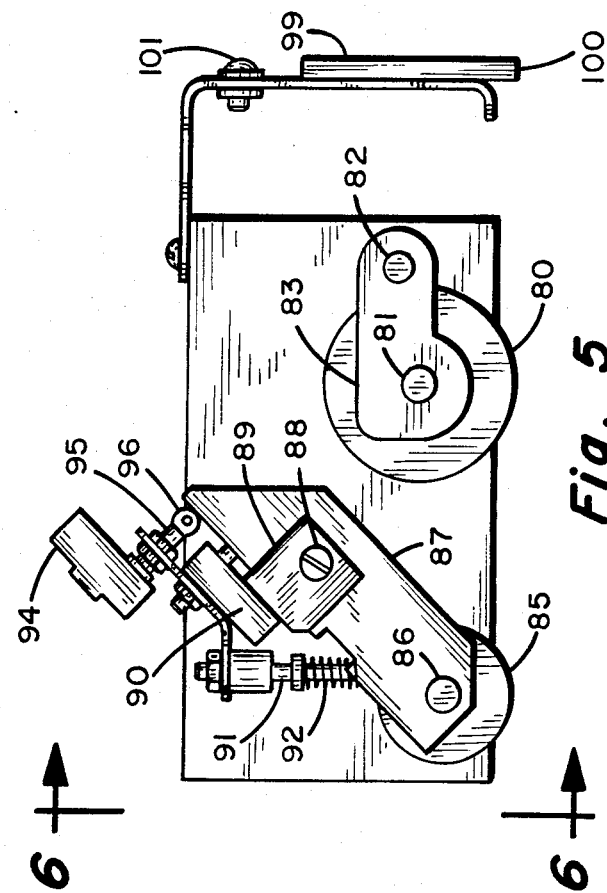
FIG. 5 is a detail view, partially in section, and illustrating the pinch wheel or infeed draw roll and workpiece sensor assembly of the apparatus of the present invention.

The workpiece or product sensor assembly is illustrated in FIG. 5. Specifically, workpieces are driven under the influence of pinch roll 80, with pinch roll 80 operating in combination with, cooperatively with and in synchrony with endless conveyor belt 32. If desired, belt 32 may be perforated and with portions of the underside of the belt being coupled to a source of vacuum in order to assist in the hold-down of workpieces disposed therealong. Pinch roll 80 is, of course, suitably journaled as at 81, and adapted for pivotal arcuate motion about shaft 82, by means of lateral arm assemblies 83. Such pinch rolls and/or draw rolls, are, of course, known in the art, and may typically utilize an outer surface of rubber for its resilient and frictional properties.

The workpiece sensor, illustrated in the left-hand portion of FIG. 5, includes an idler puck 85 arranged to rotate on idler shaft 86, with shaft 86 being, in turn, secured within pivotal rocking arm 87. Arm 87 is, in turn, pivotally mounted to shaft or pin 88, with pin 88 being retained within bracket 89 and ultimately secured to the frame through mounting brackets shown at, for example, 90. Idler puck 85 is held in its lowered disposition by virtue of shaft 91, along with bias spring 92 providing a normal counterclockwise bias force on arm 87 about pin 88. Microswitch 94 is provided, preferably mounted on brackets 90, with Microswitch 94 having a sensing arm 95 with cam follower 96 secured thereto. The immediate disposition of arm 95 of microswitch 94 will, of course, determine the condition of the contacts of switch 94. Preferably, the contacts of switch 94 are normally open, and upon arcuate motion of that portion of bracket 87 retaining idler 85 in the clockwise direction, the plunger or sensor arm 95 of switch 94 will be permitted to move outwardly, thereby closing contacts of switch 94 to generate a product sensed signal.

As is apparent in the view of FIG. 5, and in order to protect the normal operation of the apparatus, an adjustable no-go bar is provided as at 99, with the elevation of the lower edge of the abutment of bar 99, as at 100, being adjustably positioned by means of adjustment screws 101.

Figure 6:
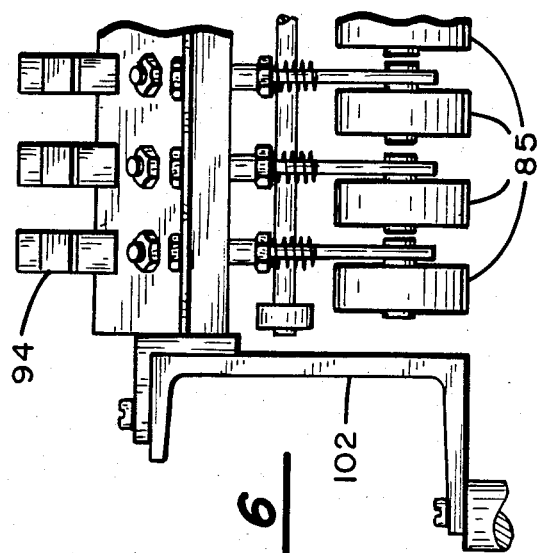
FIG. 6 is an end elevational view of a fragmentary portion only of the workpiece sensor rolls, with FIG. 6 being taken along the line and in the direction of the arrows 6—6 of FIG. 5.

With attention now being directed to FIG. 6 of the drawings, it will be observed that FIG. 6 illustrates one convenient manner in which the work sensor assembly may be mounted within the apparatus, such as on mounting channel 102.

Figure 7:
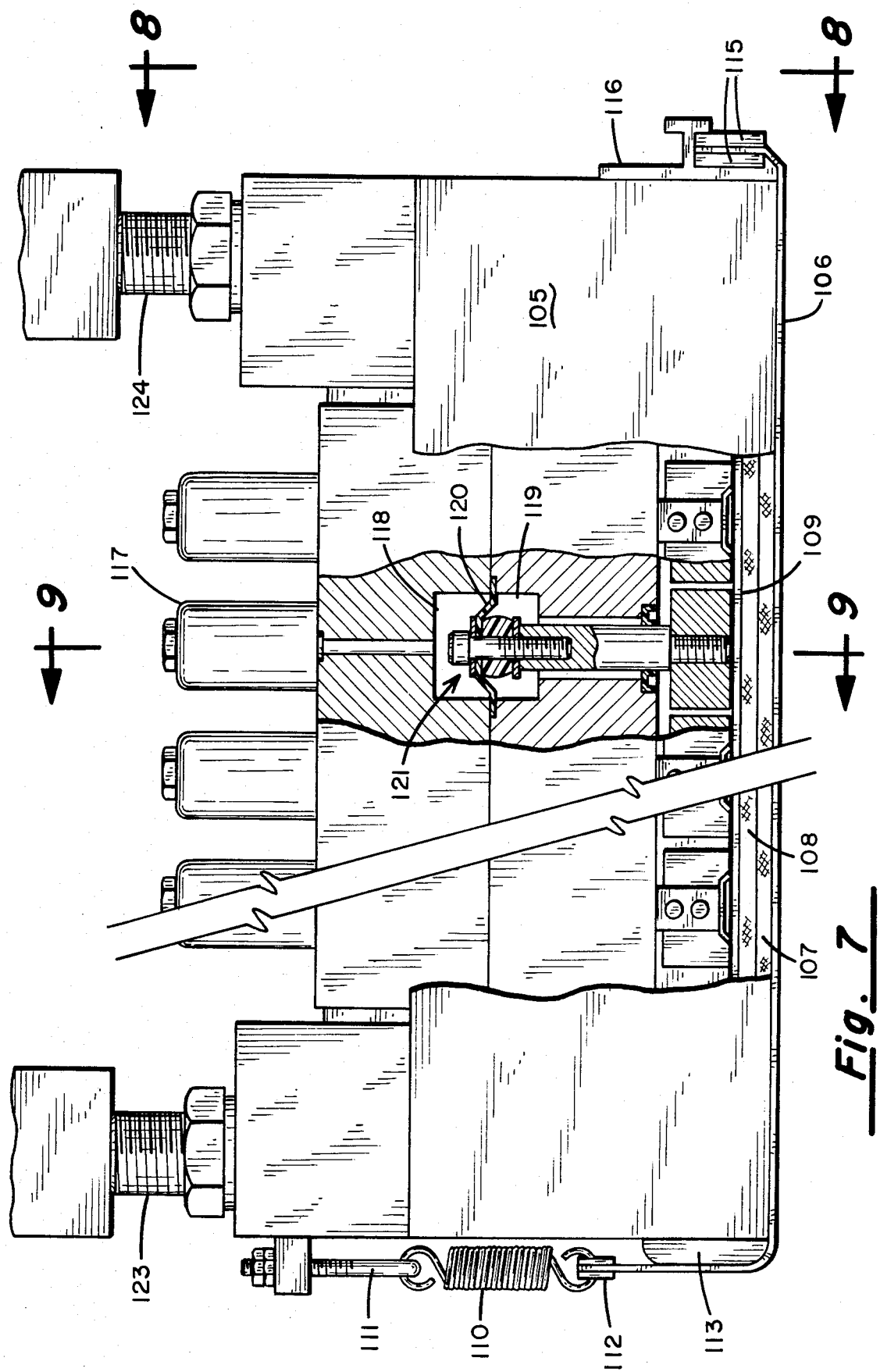
FIG. 7 is an elevational view of the apparatus taken along the infeed direction of the conveyor belt portion thereof, and illustrating the expanse and width of the platen utilized to control and delineate the path for the cross-belt.

Attention is now directed to FIG. 7 of the drawings, wherein the cross-belt head 105 is illustrated. There are, of course, many features in common between cross-belt head 105 and longitudinal belt head 45 described hereinabove. Specifically, cross-belt head 105 employs a graphite pad as at 106 which reduces friction appropriately, and which is provided with its individual back-up pads including felt-pad 107, back-up pad 108, and additional spring steel strip or plate 109 which operates as a felt pad support. This padding portion of cross-belt head is, of course, substantially similar to that previously described in connection with the apparatus shown in FIG. 3. These individual pads are shown in greater detail in FIG. 9 of the drawings, it being noted that for purposes of limitations of draftsmanship, reference should be made to FIG. 9 for these details.

In order to control and maintain constant tension on graphite pad 106, resilient spring member 110 is provided, with an end of spring 110 being retained within adjustable eye-bolt 111, and ultimately retained in clamping plate 112. Guide plate 113 may be provided to protect graphite belt 106 from contact with sharp corners. A clamping plate for the other end of graphite belt 106 is provided as at 115—115, with retainer member 116 being utilized to hold that portion of the assembly in place.

As set forth in connection with the longitudinal belt-head, the individual cylinders of cross-belt head are controlled by separate solenoids as at 117, with solenoids 117 controlling, in turn, the pressure differential as it may appear within chambers 118 and 119, separated by a flexible diaphragm 120. The actuation, motion and other details of diaphragm cylinder generally designated 121 are, of course, substantially identical to those as described in connection with diaphragm cylinder 60 of that portion of the apparatus illustrated in FIG. 3. For de-actuation or retraction of the rod of the diaphragm cylinder, each of the solenoids 117 would be provided with a means to vent the actuation chamber of its associated diaphragm cylinder to atmosphere. In order to achieve alignment and adjustable positioning of cross-belt head 105, adjustment screws are provided at either end thereof, including the adjustment mount at 123 and 124.

Attention is now directed to FIG. 8 of the drawings, which, as previously indicated, illustrates an end elevational view of the cross-belt head 105 of FIG. 7. This view illustrates in greater detail certain of those features previously described in connection with the description of FIG. 7.

Attention is now directed to FIG. 9 of the drawings, which illustrates in greater detail the substance of the individual diaphragm cylinders, such as identified previously at 60 and 121, with the details in FIG. 9 being enhanced due to limitations of draftsmanship dictated by the scale of FIGS. 3 and 7. Specifically, cylinder 121, comprises a two-segment body as at 125 and 126, defining upper and lower chambers 127 and 128 respectively. Body portions 125 and 126 may be off-set, as illustrated in FIG. 9, to ensure ease of assembly and preservation of port sealing.

Flexible diaphragm 130 is mounted upon rod component 131, through washer 132 and diaphragm collar element 133. Rod 134 is adapted to move in the direction of the double-headed arrow 135 in response to pressure differentials between chambers 127 and 128. Chamber 127 is coupled to compressed air through port 137, with compressed air or other fluid entering in accordance with the air-in arrow illustrated. Opposed chamber 127 obtains its supply of air under pressure through port 139, with the control of the air-in as at 140 being achieved by means of solenoid valve 117. Bore 141 couples chamber 127 to compressed air or other fluid port 139 through solenoid valve 117. It has been found that diaphragm cylinders are preferred inasmuch as a greater density of such cylinders is possible due to the compact nature of these devices in an assembled array.

Attention is now directed to FIG. 10 of the drawings which illustrates a conventional control-panel useful in combination with the apparatus of the present invention. Specifically, the control panel provides the operator with a means for observing the operation of the apparatus, and a means for adjusting and/or controlling its operation as well. With continued attention being directed to FIG. 10 of the drawings, control panel generally designated 145 includes, as is apparent, a number of control elements and gauges. Pressure-control for the apparatus is generally achieved by those elements illustrated in the upper portion of control 145 of FIG. 10. In particular, the platen-raise or platen-up pressure which is manifested by that system pressure contained within chamber 128 of diaphragm cylinder 121 may be controlled by adjustment value 146. Gauge 147 is utilized to indicate the platen-raise pressure. Cross-belt platen finishing pressure is adjusted by valve control 148, with the finishing pressure gauge being provided as at 149. Wide-belt or longitudinal-belts as shown at 16, 17 and 18, are conveniently controlled through finishing control valve adjustment means as at 150, 151 and 152 respectively. The system pressure for each of the platens controlling longitudinal valves, such as that experienced in valve chamber 62, with the magnitude of the force applied being represented in gauges 153, 154 and 155 for the individual working stations.

Turning now to the lower portion of the control panel 145, individual meters may be provided to indicate feed-speed as at 156, cross-belt load meter as at 157, load meter for the first londitudinal head 16 as at 158, second longitudinal head 17 as at 159, and a third head 18 as at 160.

The control panel contains on-off control switches for the individual heads, as in the column headed by switch 161. The individual heads are controlled by brake-reset switches as shown in the column headed by switch member 162. The brake switches are provided for each of the individual heads in the column headed by switch 163.

The platen controls are illustrated in the individual columns of controls such as columns 164 and 165. Specifically, column 164 has four individual knobs, each with three individual settings, for controlling the platen position in either down, off or "automatic" disposition. With respect to the knobs in column 165, these knobs provide for the control of segments of the individual heads to operate either as "segments" or as a "solid" platen. Specifically, the knobs in column 164 include knobs 164A for the platen of assembly 18, 164B for the platen controlling assembly 17, knob 164C for controlling assembly 16, and knob 164D for controlling crosshead assembly 15. Similar designations, and similar arrangements of switches and knobs will, of course, be consistent throughout the array illustrated at 145 in FIG. 10. Control knobs in columns 166 and 167 are utilized to control platen segments in the following fashion. Specifically, the knobs in column 166 are utilized to add either one, two, three or four adjacent segments to the left of those segments responding to the presence of sensed work, with this arrangement further providing for the actuation of no additional segments. Similarly, the control knobs in column 167 may be utilized to control the actuation of platen segments through the addition of either zero, one, two, three or four next-adjacent segments to the right of those actuated by the presence of sensed work.

With attention now being directed to the last full column of controls, control 168 typically is used to control the introduction of pressurized fluid against the abrasive belts on an on-off basis. A vacuum for conveyor belt 32 may be controlled by switch 168A. The conveyor feed on-switch is illustrated at 169, with conveyor off-switch being illustrated at 170. The conveyor speed control is shown at 171, with the energization of all controls being controlled by switch 172. An emergency stop bottom is typically provided as at 173. An overriding timing control is provided for the individual platen heads, and the time control system illustrated generally at 174. Thumb wheels are provided as at, for example, 175 and 176 for delaying the actuation and retraction of the individual platen segments from a preset time following the occurrence of a sensing signal. The lowering of the platen head may be controlled by an adjustment wheel 175 which is utilized to control the discharge time of a preset timer, for delaying the lowering of the head, such as head 18, with thumb wheel 176 being utilized to delay the raising of either all or those segments lower of platen controlling head 18. Similar time delays are provided at 177, 178 and 179 for the remaining heads.

Figure 11:
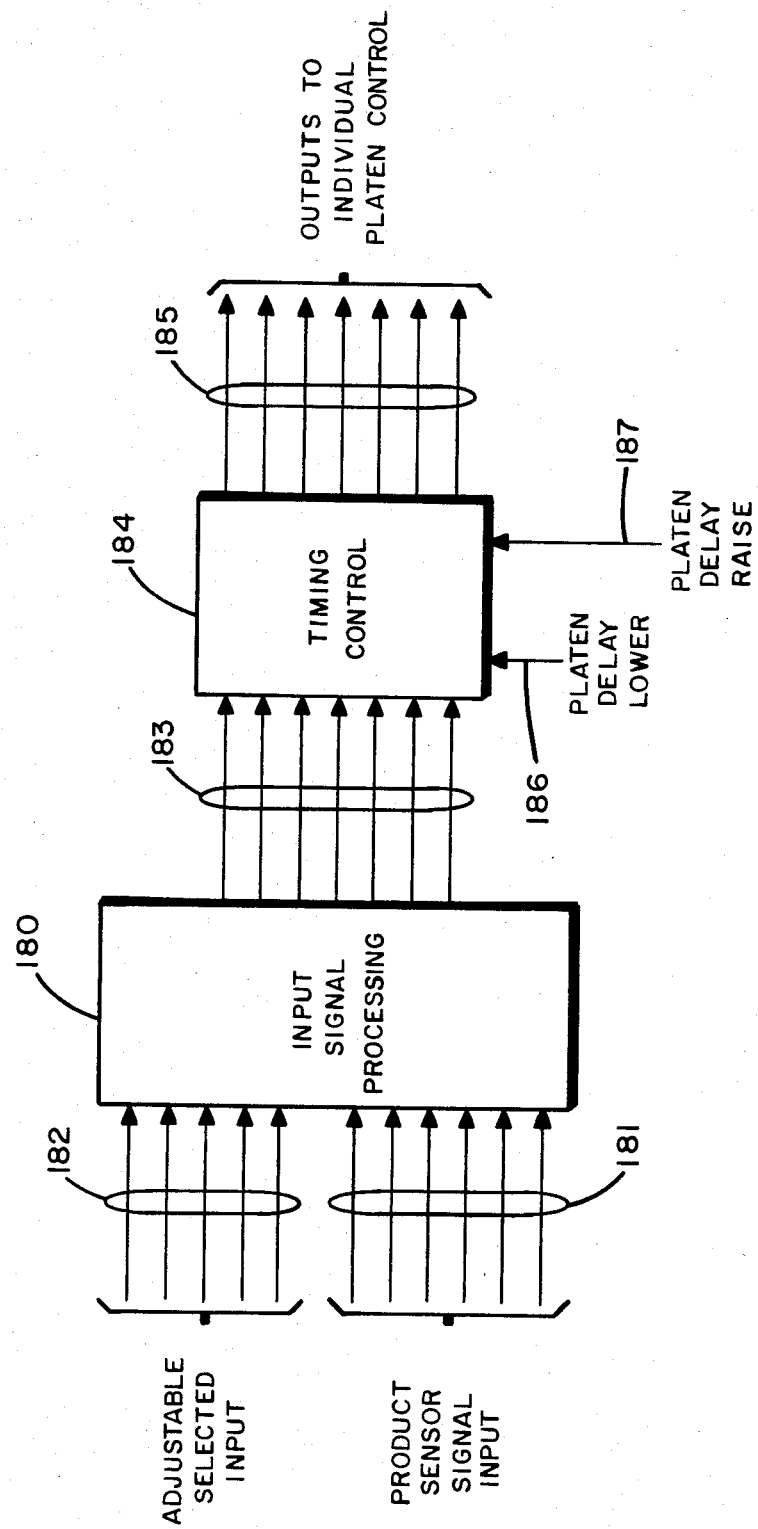
FIG. 11 is a schematic view illustrating the manner in which the product sensing input signals and additional procduct simulating or product width enhancing signals are processed for platen segment control, along with timing controls for generating output signals for control of the individual platen segment solenoid control valves.

Attention is now directed to FIG. 11 of the drawings which illustrates, schematically, the system as it is designed to operate. The electronics for such a translator system are, of course, well-known, and can be achieved by appropriate selection of microchips. Product sensor signal inputs are obtained as signals from the individual Microswitches such as Microswitch 94. Input signal processing occurs within block 180, with the product sensor signal inpouts being shown schematically as a group at 181. Adjustable selected inputs from those control knobs in the groups shown at 166 and 167 are utilized to supplement the sensed outputs to simulate a larger workpiece. Specifically, adjustment of control knobs in the group at 166 and 167 permit the addition of individual segments either to the left or to the right of the segments actuated by the product sensor, so as to simulate a wider workpiece entering the stations. These adjustable selected inputs are shown schematically at 182. The timing control for raising or lowering the platen segments, such as shown at 174 in FIG. 10, is achieved within the schematic section as at 184. The outputs to the individual platen control valves, such as the solenoid valves 117, and the associated identical solenoid valves is achieved by the outputs to the individual platen control valves as at 185. Combinations of microprocessors for achieving the desired outputs for the individual platen control valves are available commercially. Other microprocessor control devices and translators may be fabricated specifically to achieve the results desired.

In a typical operation, if the operator wishes to utilize both cross-belt and longitudinal-belts in a fashion wherein two segments to the left, and one segment to the right will be added to those segments actuated by a sensed signal, the appropriate entry is placed upon the control knobs in columns 166 and 167. Thereafter, the work is placed upon conveyor 32 at the infeed station, and its presence is appropriately sensed by idler puck 85. Those platen segments actuated by the appropriate associated puck 85 are, of course, driven downwardly so as to delineate the configuration of the platen segment. In addition, two segments to the left of the sensed segment along with one segment to the right are lowered, thus further delineating the configuration of the platen, and controlling the motion of the associated endless abrasive belt.

Figure 12:
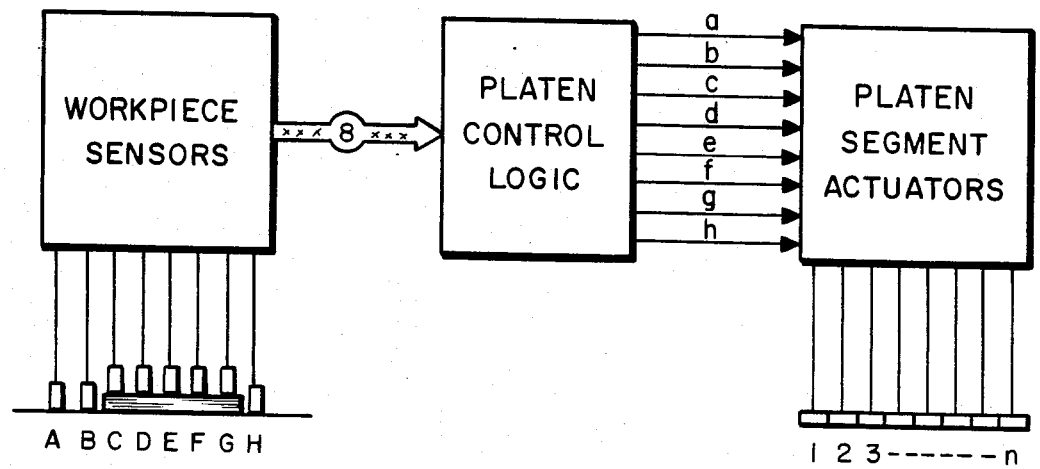
FIG. 12 is a flow diagram illustrating the manner in which signals generated by the workpiece sensors are passed through the platen control logic to actuate selected platens in the overall system.

With attention being directed to FIG. 12, the workpiece or product sensor assembly may comprise a plurality of Microswitches, each of which is arranged to be actuated by the displacement of a product sensing idler puck A through H when the corresponding or associated idler puck is displaced by the presence of a board to be finished. As is shown in the sketch, pucks C–G are elevated such that the corresponding Microswitches associated with those pucks have their contacts closed. In that the pucks A, B and H do not engage the board, the Microswitches associated with them would normally remain open.

Means are provided in the sensor assembly for developing a binary signal indicative of the open or closed condition of any one of the switches A through H. These binary signals are applied via a suitable cable to the platen control logic.

As is well known in the art, the platen control logic may comprise a translator or function table for producing output signals on the lines a–h dependent upon the binary state of the signals emanating from the workpiece sensor and applied to the platen control logic.

In one arrangement, the platen control logic is arranged such that output signals will be developed on the lines labeled a–h in accordance with a fixed or hard wired truth table which will cause output signals to be developed not only on the lines a–h associated with the particular actuated sensors A through H, but also on the lines corresponding to the ones which are one to the left and one to the right of the ones that are actually actuated. For example, if, as illustrated, product sensing idler pucks C, D, E, F, and G are engaged by the board to be finished, output signals will not only appear on the lines c, d, e, f, and g, but also on line b and line h.

The output from the platen control logic is applied to the platen segment actuators which, in the preferred embodiment, may comprise air solenoids such as solenoids 117 whose output controls operation of the platen segments 1 through n. In other words, the output from the platen control logic actuates suitable valves associated with the actuators to cause a predetermined displacement of only those certain cylinders associated with the lines a through h which happen to have the control signals developed upon them.

The following Table I illustrates an operative arrangement for a translator wherein one segment to the left and one segment to the right of those segments responding to the presence of sensing product are actuated.

| A | a |
| B | a,b,c |
| C | b,c,d |
| D | c,d,e |
| E | d,e,f |
| F | e,f,g |
| G | f,g,h |
| H | g,h |
| A,B | a,b,c |
| A,B,C | a,b,c,d |
| A,B,C,D | a,b,c,d,e |
| C,D | b,c,d,e |
| B,C | a,b,c,d |

In another arrangement, the platen control logic (translator) can be adjusted and structured to cause two platen segments to be left of the product and/or two platen segments to the right of the product to be actuated. Alternatively, either set of these two added segments on each side of the product may be actuated. Means are incorporated within the logic and translators for switching platens into operative relationship, with these means being disposed in the system between the workpiece sensors and the platen segment actuators.

Stated another way, therefore, if it has been found that dubbing of the edges of a workpiece is minimized when a platen profile is generated along a system which utilizes three additional segments to the left of the workpiece, and two additional segments to the right of the workpiece, each of these being in addition to the, for example, five segments occupied by the workpiece per se, then the following arrangement is followed. The control panel is initially set up with control knob in column 166 being adjusted to add two additional segments to the left of those segments which the presence of work is sensed. Additionally, control knob in column 167 is preset so that the apparatus will add one segment to the right of those segments which respond to the presence of work. Thereafter, as the workpiece moves along the surface of the conveyor, idlers contacting the surface of the work will energize five segments, for example, in the center of the segmented platen. Those five segments, together with two additional segments to the left and one additional segment to the right will be energized, thereby creating the desired profile for the pressure-bias portion of the platen against the surface of the workpiece traveling through the working station.

The timing of the application of pressure and initiation of downward motion of the platen segments, such as the point in time at which the individual segments are advanced is linked to the conveyor speed and otherwise dependent upon the configuration of the workpiece. Those skilled in the art recognize that the leading edge of a given workpiece should have already been advanced to a point within the working station when the platen segments are advanced and contact between the workpiece and the abrasive belt occurs. In such a procedure, dubbing is held to a minimum. The point in time at which the platen segments are relaxed, and the abrasive belt moves away to a point out of contact with the workpiece, is also determined primarily by conveyor speed, and also dependent to a certain extent upon the configuration of the workpiece. Essentially, the platen segments are retracted at a point in time prior to the time at which the entire workpiece emerges from the working station and out-of-contact with the surface of the abrasive belt. Normally, the leading edge of the workpiece will be essentially midway beneath the zone occupied by the abrasive belt before the segment platens are advanced. The appropriate time for retracting the individual platen segments is that point in time when the trailing edge of the workpiece is substantially midway through the zone of contact with the abrasive belt. Since the rate of speed of the conveyor 12 is known, the time element representing the elapsed time from the point in time when the leading edge of the product is sensed by the product sensing means to the point in time when the platen segments are to be advanced is readily determinable. Similarly, the time element representing the elapsed time from the point in time when the trailing edge of the product is sensed by the product sensing means to the point in time when the platen segments are to be retracted is readily determinable.

In order to further add versatility of operation to the apparatus, the time delay between sensing the leading edge of the product, and when the platen segments are advanced, as well as the time delay involved between sensing the trailing edge of the product and retraction of the platen segments may be varied. Specifically, the elapsed time between each of these functions may be either increased or decreased by virtue of elapsed time modifiers, thereby permitting the machine operator to create the operational method which is best suited for the individual workpieces. By utilizing a modification of elapsed time for these functions, the platen may be advanced, for example, at a point in time when the leading edge of the workpiece has already passed beyond the midway point, and the retraction operation may be directed to occur at a point in time prior to the trailing edge reaching the midway point beneath the zone occupied by the abrasive belt.

What is claimed is:

1. In a sanding and polishing machine for individual workpieces and having a frame, infeed conveyor means arranged thereon for conveying workpieces along a predetermined path, endless abrasive belt means coupled to the frame and defining a working station disposed along said path and including an endless abrasive belt, means driving said belt, belt guide means, and segmented platen means for adjustably positioning said belt guide means relative to said predetermined path, the improvement comprising:

(a) said adjustable positioning means comprising a plurality of vertically movable plunger means for adjustably positioning individual segments of said segmented platen means to define the composite configuration of said segmented platen means;

(b) control means for controllably actuating selected ones of said plurality of vertically movable plunger means;

(c) sensing means normally disposed above said conveyor means for sensing the width, in a direction transverse to the feed path, of individual workpieces moving along said conveyor means and for creating a product presence signal responsive to the sensed condition of a workpiece being present therebeneath;

(d) signal processing means having a first input responsive to the signal created by said sensing means to actuate said control means so as to actuate a selected number of said plurality of plunger means corresponding to the sensed width of the individual workpieces; and (e) said signal processing means further having and a second input, said second input associated with said signal processing means to create an output signal in addition to said product presence signal for selectively actuating a predetermined number of said plurality of vertically movable plunger means in addition to those actuated by said product presence signal and disposed adjacent thereto for controllably positioning said segmented platen means relative to said infeed conveyor means so that the actuated segments of the platen extend beyond the width of the individual workpieces.

2. The sanding and polishing machine as defined in claim 1 being particularly characterized in that diaphragm cylinders are employed for imparting motion to said plurality of vertically movable plunger means.

3. The sanding and polishing machine as defined in claim 1 being particularly characterized in that said endless abrasive belts include belts driven along an axis transverse to the axis of said infeed conveyor means.

4. The sanding and polishing machine as defined in claim 3 being particularly characterized in that said apparatus includes a plurality of endless abrasive belts including belts driven along a drive axis generally parallel to the axis of said infeed conveyor means.

* * * * *